INVENTOR.
WILLIAM H. TYGART
BY George C. Sullivan
Agent

Feb. 4, 1969 W. H. TYGART 3,426,151
APPARATUS FOR RECEPTION OF REMOTELY TRANSMITTED
DATA UTILIZING A FREQUENCY MODULATED CARRIER
SIGNAL WITHIN THE AUDIO SPEECH RANGE
Filed Nov. 15, 1965

INVENTOR.
WILLIAM H. TYGART
BY
George C. Sullivan
Agent

INVENTOR.
WILLIAM H. TYGART
BY George C. Sullivan
Agent

INVENTOR.
WILLIAM H. TYGART
BY George Sullivan
Agent 3,426,151

APPARATUS FOR RECEPTION OF REMOTELY TRANSMITTED DATA UTILIZING A FREQUENCY MODULATED CARRIER SIGNAL WITHIN THE AUDIO SPEECH RANGE

William H. Tygart, Marietta, Ga., assignor to Lockheed Aircraft Corporation, Burbank, Calif.

Filed Nov. 15, 1965, Ser. No. 507,819
U.S. Cl. 179—2 13 Claims
Int. Cl. H04m *11/00*

ABSTRACT OF THE DISCLOSURE

Apparatus for receiving cardiological information or other data which has been converted to a frequency modulated carrier signal within the audio speech range and then transmitted over a voice communication link such as a conventional telephone system or the like. Signals present in the receiving telephone are coupled to the data demodulating portion of the present apparatus through a band-pass filter which permits substantial passage only of the modulated carrier frequency. The instantaneous carrier frequency triggers a pulse source having output pulses of equal duration and of a repetition rate controlled by the instantaneous carrier frequency. These output pulses go to a low-pass filter the output of which is a reproduction of the data signals originally producing the frequency modulation. Circuitry is provided which receives the output of the lowpass filter and cancels the carrier signal portion thereof, leaving only the modulation signal portion for presentation to a recorder or other utilization device. The signal received by the transducer also is supplied through a band elimination filter to an amplifier and loudspeaker, the band elimination filter substantially removing the carrier signal to permit simultaneous voice communication over the telephone system without the presence of an annoying audible carrier signal.

This invention relates in general to data communication and in particular to apparatus whereby cardiological or other medical data which has been converted to audible sound for transmission over a voice communication link such as a telephone line may be reconverted at the receiving end into an electrical signal that is a faithful reproduction of the data that was converted to the audible signal.

For some time there has existed in the medical profession a need for an apparatus or system which will enable medical data, such as cardiographic data, to be transmitted from the location of the patient to a receiving or recording location remote of the patient. Such apparatus may be particularly useful, for example, in the case of a patient who is not conveniently or medically able to be moved to the office of a doctor or other location whereat conventional cardiographic recording equipment is situated.

There are known to the prior art apparatus and systems for recording the cardiogram of a patient situated at some remote location. Such apparatus and systems, however, generally involve the use of complex and expensive equipment, in addition to the conventional cardiographic recorder, which must be installed at both the transmitting and receiving locations on at least a semipermanent basis and which frequently require lease of a special telephone line to provide the necessary communication link. Obvious disadvantages of such systems are the expense, lack of flexibility, and non-adaptability to emergency situations arising in locations where prior arrangements have not been made for the installation and use of such apparatus.

There has been developed apparatus for converting medical data existing in or convertible to the form of electrical impulses, for example, the electrical potentials generated by the heart, into audible signals capable of being introduced to and transmitted over a voice communication link such as a conventional telephone system or the like without the necessity of attachment to or modification of any of the apparatus associated with the voice communication link. Such apparatus is exemplified in United States patent application Ser. No. 490,359, filed Sept. 27, 1965, for "Apparatus for Remote Transmission of Data," having the same inventor and being assigned to the same assignee as the present invention.

Stated briefly, the apparatus of the aforementioned application receives electrical impulses as detected by suitable body electrodes, selects the impulses from the desired electrode or combination of electrodes, amplifies these impulses, and applies this amplified signal to an oscillator having an output frequency which varies in accordance with the applied voltage. This oscillator has a frequency range of operation preferably located in the speech range for which conventional speech communication systems, such as telephone systems, are designed to operate; the oscillator may have a no-signal carrier frequency of, for example, 2 kc. This varying frequency output is amplified and then converted by a suitable transducer into audible sound which is picked up by the microphone of the voice communication link being used. Of course, the frequency modulated signal could also be generated by other apparatus and could be introduced to the communication link by other techniques such as direct wire connection.

While the apparatus of the aforesaid co-pending application provides a lightweight, compact, self-contained transmitter requiring no wire or other direct connection to the communication with which it is used, this transmitting apparatus provides only half of the solution to the problem of recording a cardiogram of a patient located remotely of the cardiograph instrument. suitable apparatus must be provided at the receiving or cardiograph end of the communication link for converting the signals received at that point into electrical impulses which are substantially identical to the heart-produced impulses causing the transmitted variations in frequency and which are to be used for providing the input signal to the cardiograph.

Receiving equipment for this purpose preferably should be relatively compact, easily operated by one who is not an engineer or who does not have specialized knowledge of the operation of electronic instruments, and should be capable of being produced sufficiently inexpensively to promote its widespread acceptance. Furthermore, such receiving apparatus preferably should be sufficiently compact to be considered as being truly portable and should necessitate no direct wire connection to the receiving portion of the communication link being used.

According to the present invention, there has been devised a receiving apparatus capable of use with a conventional telephone or other voice communication link without resort to direct connection thereto and which functions to convert audible signals of varying frequency, corresponding to cardiological potentials or other transmitted data, into a signal which is a faithful reproduction of these heart signals or other data and which may be used to provide the input to a conventional cardiograph or other recording instrument. According to an embodiment of this invention, the circuitry of the receiving apparatus is completely transistorized and may be battery-powered to ensure compactness, portability and freedom from interference or unwanted signals possibly present with the conventional AC power supply.

Accordingly, it is an object of this invention to provide an improved apparatus for the reception of remotely transmitted data.

Another object of this invention is to provide apparatus for the reception of data remotely transmitted by means of a voice communication system.

Still another object of this invention is to provide apparatus for the reception of data in which no wire connection need be provided between the apparatus and the communication link.

Yet another object of this invention is to provide apparatus for the reception of remotely transmitted medical data wherein the apparatus is readily operable by one not possessing special expertise in electronics or instrumentation.

A further object of this invention is to provide apparatus for the reception of data in the form of variable frequency signals within the range of audibility and for converting these audible signals into a signal which is a faithful reproduction of the signal giving rise to the audible signal.

Another object of this invention is to provide apparatus for the reception of data from a communication link wherein the operator of the apparatus can readily determine whether the transmission quality of the communication link is sufficiently good to enable a meaningful transfer of information to be accomplished.

A still further object of this invention is to provide apparatus for the reception of data remotely transmitted over a voice communication link wherein the normal functioning of the voice communication link is not impaired.

The exact nature of this invention as well as other objects and advantages thereof will be readily apparent from consideration of the following specification relating to the annexed drawings in which.

Figure 1:
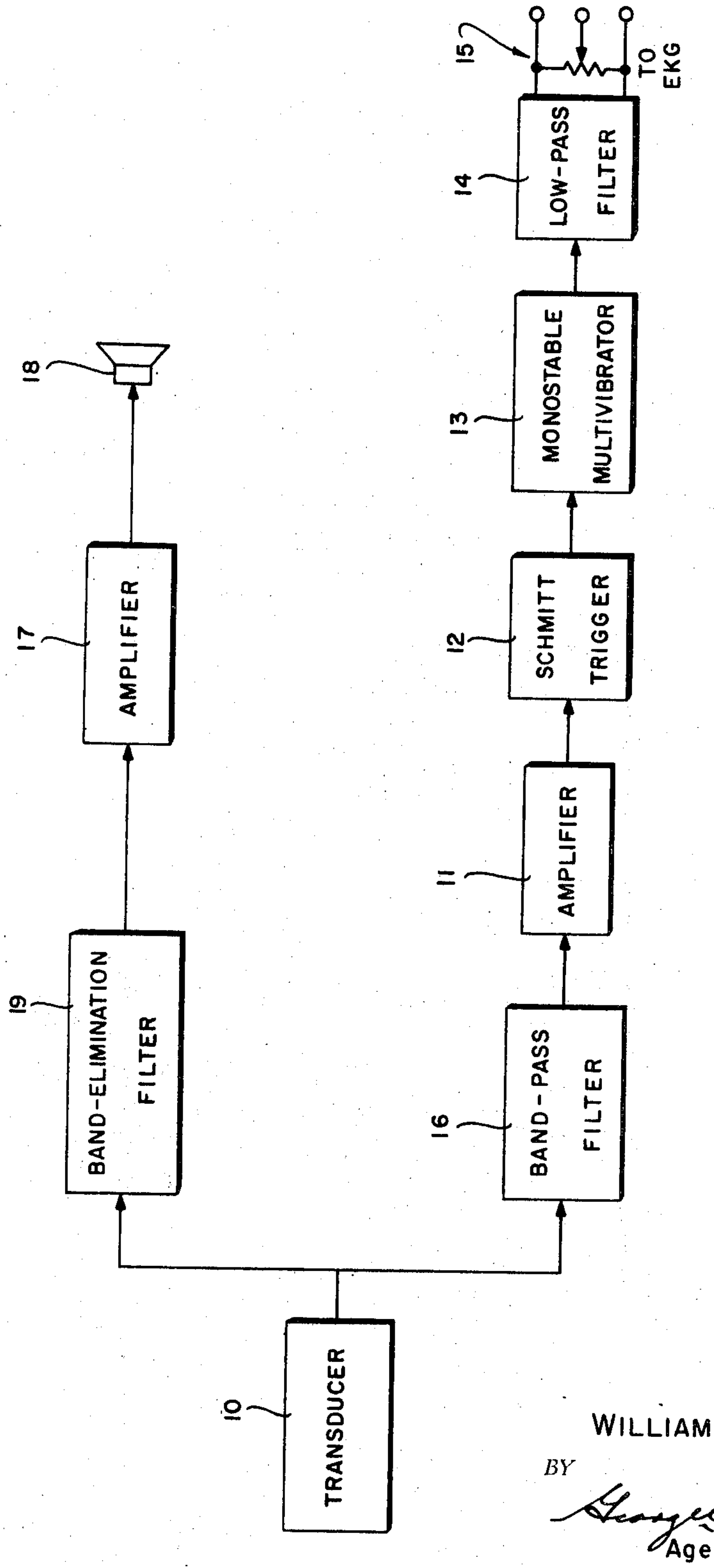
FIGURE 1 shows a block diagram of an embodiment of this invention.

Stated generally and referring to FIGURE 1 of the drawing, the embodiment of this invention shown therein utilizes a suitable transducer 10 to receive the signal which is present at the receiving end of the voice communication link and which contains information relating to cardiographic or other data as inserted into the voice communication link at the transmitting end thereof. The signals as received by the transducer and as passed by band-pass filter 16 then are amplified at 11 and passed on to a Schmitt trigger stage 12 wherein is produced an output suitable for driving the following one-shot monostable multivibrator stage 13. Output from the monostable multivibrator 13, comprising rectangular wave pulses of substantially equal duration, is supplied to a low-pass filter 14 whereby the carrier signal and other unwanted signals are removed and the remaining signal is supplied through variable output 15 to an electrocardiographic or other suitable recorder. A separate speech amplifier 17 and speaker 18 are provided to facilitate the reception of speech being passed over the audio communication link, with the input signal to speech amplifier 17 being supplied through band-elimination filter 19 for a purpose to be described below.

Figure 2:
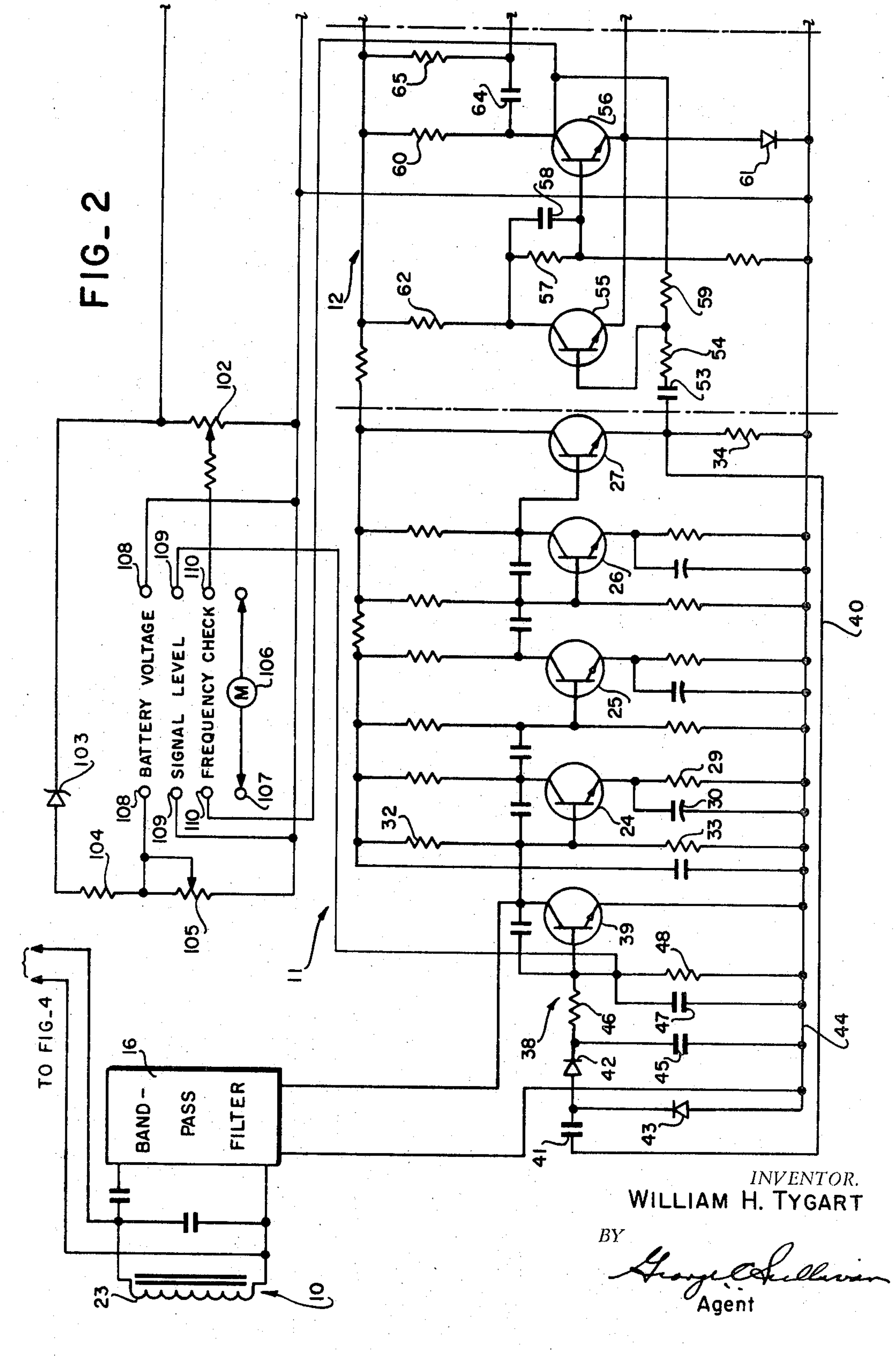
FIGURES 2 and 3 show a schematic diagram of a portion of an embodiment according to this invention.
Figure 3:
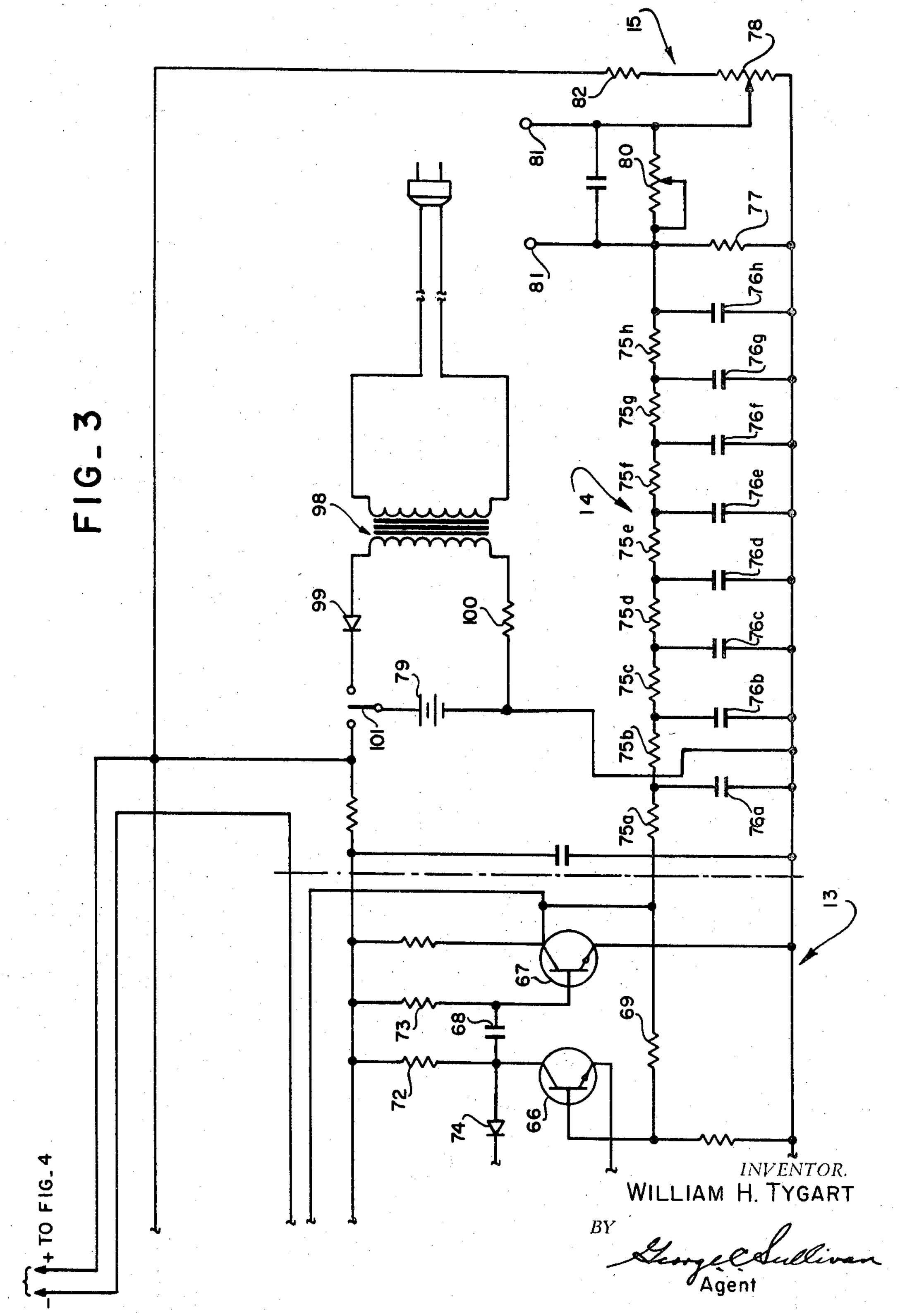
Figure 4:
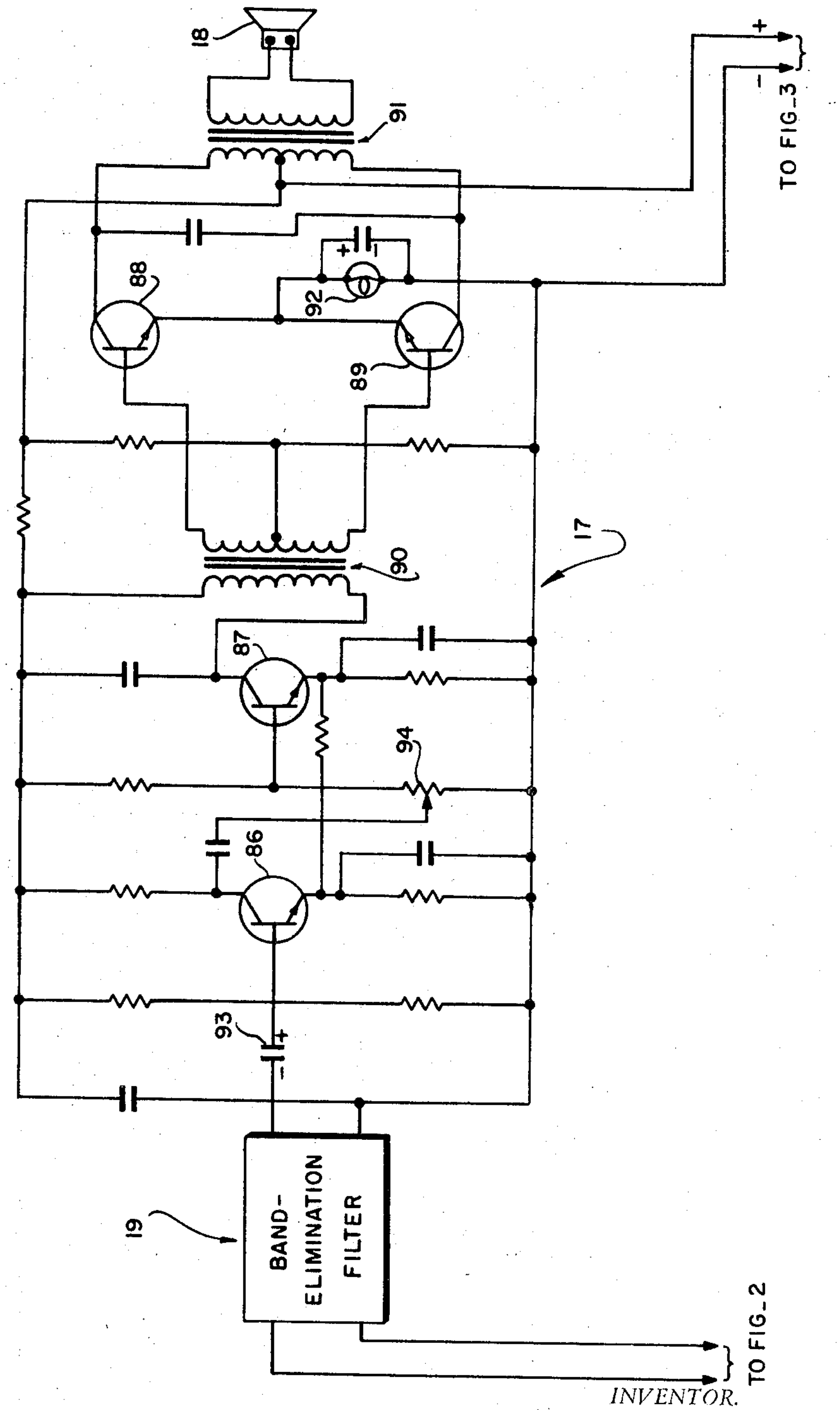
FIGURE 4 shows a schematic diagram of the remainder of the embodiment partially shown in FIGURES 2 and 3.

FIGURES 2, 3 and 4 show a schematic diagram of the various elements described generally with reference to FIGURE 1, with like elements being identified by like reference numerals. In the embodiment of the invention shown herein, it is assumed that this embodiment normally will be used in conjunction with a conventional telephone system of the kind known to those skilled in the art. The receiver portion of a conventional telephone handset comprises a permanent-magnet transducer, and electrical currents flowing in the coil of this transducer generate an electromagnetic field which is detectable outside the handset by means of a suitably disposed induction coil.

Accordingly, in this embodiment of the invention transducer 10 takes the form of an induction coil 23 designed and disposed with respect to the apparatus to permit a telephone handset to be easily and conveniently disposed in or on the apparatus so that the receiver portion of the handset is located adjacent induction coil 23. By way of explanation only, it has been experimentally determined that an induction coil made up of approximately 1,000 turns of #36 enameled wire wound in a coil approximately 2.5 inches in diameter provides satisfactory results. Of course, it will be understood that the use of an induction coil for transducer 10 is predicated on the fact of intended use with a conventional telephone receiver and that this transducer 10 may comprise any transducer which functions to convert either electrical signals in the audio range or the actual audio waves into an electrical equivalent signal useful for driving amplifiers 11 and 17.

Band-pass filter 16 is of conventional design, known to those skilled in the art, and so is shown in block form in FIGURE 2. The center frequency of this filter is chosen to coincide with the carrier frequency of the signal to be received, and the band-pass filter 16 is chosen to permit passage with no appreciable attenuation of signals in the range of normally expected frequency modulation of the carrier. Band-pass filter 16 is present to prevent a substantial amount of speech frequencies from entering the following amplifier 11, Schmitt trigger 12, and monostable multivibrator 13; it has been found, however, that the use of band-pass filter 16 is optional in some applications where the carrier may be interrupted to permit voice communication or where the signal level of the received carried is sufficiently strong to enable the transmitted information to be received without interference from the additional presence of speech frequencies.

Amplifier 11 comprises three relatively straightforward stages of transistor amplification including transistors 24, 25 and 26, the last stage of which is coupled into an emitter follower stage utilizing transistor 27. The three amplifier stages of amplifier 11 are typified by the first stage in which a signal induced in induction coil 23 is coupled to the base of transistor 24. Emitter bias for the transistor 24 is provided by means of emitter bias resistance 29 and its associated bypass capacitance 30, while forward bias for the transistor is provided through a voltage divider consisting of resistances 32 and 33. The specific details of the other two stages of amplifier 11 will not be detailed since it is believed that these details are obvious to those skilled in the art. The emitter follower stage comprising transistor 27 and resistance 34 serves to isolate amplifier 11 from following Schmitt trigger stage 12 and to provide impedance matching between these two stages.

Associated with amplifier 11 is an automatic gain control circuit indicated generally at 38 and including transistor 39 connected in shunt across the emitter-base circuit of transistor 24. The conductivity of transistor 39 is controlled by a signal taken across resistance 34 and fed back through line 40 and coupling capacitance 41. Diode 42 ensures that only a feedback signal of positive polarity is applied to the base of transistor 39, while diode 43 enables feedback signals of negative polarity to be bypassed to the common return line 44. Capacitance 45, resistance 46 and capacitance 47 comprise a low-pass filter for a purpose to be described later. The signal appearing across resistance 48 is applied to the base of transistor 39 to vary the conductivity of this transistor.

The output across resistance 34 of the emitter follower stage also is coupled through capacitance 53 and resistance 54 to the Schmitt trigger circuit 12 comprising transistors 55 and 56. Coupling is provided between the collector of transistor 55 and the base of transistor 56 by means of resistance 57 and commutating capacitance 58, while resistance 59 provides coupling between the collector of transistor 56 and the base of transistor 55. The emitters of transistors 55 and 56 are returned to ground through diode 61 to provide improved voltage stabilization characteristics. Resistances 62 and 60 are in the respective collector circuits of transistors 55 and 56.

The rectangular wave output of the Schmitt trigger circuit 12, as taken across the collector of transistor 56, is passed through a differentiating circuit comprising capacitance 64 and resistance 65 whereby there is presented to the following stage a signal consisting of a positive voltage pulse and a negative voltage pulse in response to a rectangular output wave of the Schmitt trigger. In this embodiment of the invention and with the use of NPN transistors as shown, the compontnts of Schmitt trigger circuit 12 are chosen such that in the absence of an input signal to the trigger circuit transistor 55 is cut off and transistor 56 is conducting.

The differential output of Schmitt trigger circuit 12 is supplied to monostable multivibrator 13 comprising transistors 66 and 67. Capacitance 68 provides AC coupling between the collector of transistor 66 and the base of transistor 67, while resistance 69 provides coupling between the collector of transistor 67 and the base of transistor 66. The emitter of transistor 67 is directly connected to ground, while the emitter of transistor 66 is connected to ground through aforementioned diode 61. Resistance 72 is in the collector circuit of transistor 66, while resistance 73 completes an RC circuit including capacitance 68 and connected to the base of transistor 67.

Trigger pulses from the preceding Schmitt trigger stage are supplied to the collector of transistor 66 through diode 74, which is connected so that only negative-going pulses will be supplied from stage 12 to stage 13. With the use of NPN transistors as shown, the circuit components of monostable multivibrator 13 are chosen such that in the absence of a trigger signal from the preceding stage transistor 66 is cut off and transistor 67 is conducting.

The output of monostable multivibrator 13 is taken from the collector of transistor 67 and is presented to low-pass filter 14 comprising a plurality of RC integrator circuits including resistances 75_a_–75_h_ and capacitances 76_a_–76_h_. The components of low-pass filter 14 are chosen to provide a low-pass function having relatively little attenuation throughout the range of frequencies to be recorded and having relatively high attenuation of frequencies substantially exceeding this range. Since an RC low-pass circuit is by nature an integrating circuit, the provision of a multitude of such circuits as shown also functions to smooth and integrate the pulse input to the filter 14 to provide an analog voltage output corresponding in amplitude to the pulse repetition rate of the modulated carrier signal. By way of example and without intent to limit this invention thereto, where a barrier frequency of 2 kc. is frequency modulated by a signal in the range of 0–200 c.p.s., low-pass filter 14 should pass with little or no attenuation signals in the range of 0–200 c.p.s. and should function to block substantially completely any 2 kc. component.

An example of such a low-pass filter is provided by these component values:

| | R (ohms) | | C (mfd.) |
|---|---|---|---|
| 75*a* | 20,000 | 76*a* | 0.025 |
| 75*b* | 20,000 | 76*b* | 0.025 |
| 75*c* | 20,000 | 76*c* | 0.025 |
| 75*d* | 20,000 | 76*d* | 0.025 |
| 75*e* | 20,000 | 76*e* | 0.025 |
| 75*f* | 20,000 | 76*f* | 0.025 |
| 75*g* | 20,000 | 76*g* | 0.025 |
| 75*h* | 2,200 | 76*h* | 0.01 |

The output signal from low-pass filter 14 develops across resistance 77 a signal voltage which may be supplied to a suitable electrocardiograph for other recording or data utilization instrument. A variable output circuit indicated generally at 15 provides a continuously variable output voltage for such instruments without affecting the level of the base line or steady-state output signal present when only an unmodulated carrier signal is being received by the apparatus of this invention. Circuit 15 includes a fixed resistance 82 and a potentiometer 78 connected in series across potential source 79. Connected to the slider of potentiometer 78 is another potentiometer 80 the other end of which is connected to one side of resistance 77. The output signal to the electrocardiograph or other instrument is taken at terminals 81 across potentiometer 80.

The operation of that portion of the circuit thus far described will now be examined. For purposes of explanation only, it is assumed that input to the apparatus is supplied from a conventional telephone receiver and that this input comprises a carrier signal of, for example, 2 kc. which has been frequency modulated in response to cardiological signals from electrodes disposed on a patient. After the telephonic communication has been established, the doctor, technician or other operator of the receiving and recording apparatus positions the telephone handset with respect to the apparatus of this invention so that the earpiece portion of the receiver is disposed adjacent induction coil 23. Electrical current passing through the receiver induces a signal in coil 23 and this signal, which includes a carrier wave of a predetermined frequency having frequency modulation imposed thereon, is applied to and amplified by amplifier section 11. The amplified signal from the third stage of amplifier 11 is passed through the emitter follower to supply a trigger signal for Schmitt trigger 12.

Band-pass filter 16, for the example given, has a center frequency of 2 kc. and a pass-band of 1700–2300 kc., the pass band being determined by the range of expected frequency modulation.

Schmitt trigger 12 is designed so that, in the absence of an input signal, transistor 55 is in a non-conducting state and transistor 56 is in a conducting state. Upon the receipt of an input signal exceeding a certain magnitude, however, the Schmitt trigger changes state, and transistor 55 is rendered conductive while transistor 56 is cut off. The Schmitt trigger circuit will remain in this second state until the magnitude of the input signal falls below a certain level, at which time the Schmitt trigger will suddenly revert to its initial state with transistor 55 non-conducting and transistor 56 conducting. Schmitt trigger 12 thus functions to produce a substantially rectangular wave output from an input signal which may be fluctuating in amplitude. Thus, the duration and rate of repetition of the output pulses from Schmitt trigger 12 is a function of the frequency of the input signal to the trigger.

The rectangular wave output of Schmitt trigger 12, taken across the collector of transistor 56, is passed through a differentiator circuit comprising capacitance 64 and resistance 65 so that for each rectangular wave occurring at the collector of transistor 56 there is produced as an output of Schmitt trigger 12 a positive-going pulse corresponding to the leading edge of the rectangular wave and a negative-going pulse corresponding to the trailing edge of the rectangular wave.

In the absence of an input signal applied to monostable multivibrator 13, transistor 66 is cut off and transistor 67 is conducting. A negative signal pulse applied through capacitance 68 to the base of transistor 67 produces a sudden reversal of the state of multivibrator 13, with transistor 66 being rendered conductive and transistor 67 being cut off. Although the differentiated negative input pulses applied to the base of transistor 67 are of relatively short duration, transistor 66 remains conductive and transistor 67 remains cut off until capacitance 68 charges to a sufficient level to render transistor 67 conductive. At that time, monostable multivibrator 13 suddenly reverts to its initial state with transistor 67 conductive and transistor 66 non-conductive. Thus, it can be seen that the output of monostable multivibrator 13 comprises a series of essentially rectangular pulses having substantially equal duration and having a pulse repetition rate that is a function of the repetition rate of the input signal pulses to the monostable multivibrator. Diode 74 is connected so that only negative pulses may be applied to the base of transistor 67. This prevents monostable multivibrator 13 from being adversely affected by the presence of positive pulses applied thereto, and it also renders multivibrator 13 relatively insensitive to any extraneous negative pulses which might be applied while this multivibrator is in its quasi-stable state.

Since only the pulse repetition rate, and neither the pulse duration nor pulse amplitude, of the monostable multivibrator output is affected by the instantaneous frequency of the signal induced in transducer 10 and amplified by amplifier 11, it can be seen that the average value of the output of monostable multivibrator 13 is a function of this instantaneous frequency. Since the instantaneous frequency of the signal supplied to the communication link is, in the example chosen, determined by a voltage waveform produced by the heart of a patient, the average value of the output of monostable multivibrator 13 is proportional to this cardiological voltage waveform. Calibration is readily obtained by means of the transmission over the communication link of a frequency corresponding to a one-millivolt heart signal, an accepted reference standard in the field of cardiology.

The rectangular output pulses from monostable multivibrator 13 are supplied to the low-pass filter 14, which functions to smooth the rectangular waveform applied thereto and to block substantially all passage therethrough of frequency components in excess of the desired frequency range of data being received.

The output from low-pass filter 14, which appears across resistance 77, consists of a relatively steady-state voltage corresponding to the carrier wave of the input to the apparatus of this invention and a fluctuating voltage corresponding to modulation, if any, of this carrier wave. These voltages form an output signal which is applied to a recorder or other instrument and this recorder customarily is preliminarily adjusted so that the presence of only the steady-state voltage produces a certain degree of so-called "base line" indicator deflection and so that a modulation-produced signal corresponding to transmission of a reference calibration pulse produces a certain amount of deflection or deviation of the indicator from its base line position.

If the output signal from this apparatus were taken directly across resistance 77, it is apparent that any change in the amplitude of this signal, as by a potentiometer or the like, to adjust either of the base line position or the calibration pulse deflection position would produce an unwanted change in the other of these two settings. To eliminate this bothersome result, the voltage divider consisting of fixed resistance 82 and potentiometer 78 has been provided in conjunction with potentiometer 80, across which the output of the apparatus is taken, so that adjustment of the output signal of the apparatus has no effect on the base line setting of the recording apparatus. Potentiometer 78 is adjusted so that the voltage present at the slider of this potentiometer is equal to the aforementioned steady-state voltage. The voltage present at this slider is in opposition to the steady-state voltage appearing across resistance 77, with the result that there appears across potentiometer 80 only the fluctuating voltage corresponding to the signal to be recorded. The magnitude of this fluctuating voltage may be adjusted by potentiometer 80 without any corresponding adjustment of a steady-state voltage component which would provide an unwanted base line adjustment.

So the extensive fluctuations of the strength of the signal received at induction coil 23 will not adversely affect the operation of the apparatus of this invention, the aforementioned automatic gain control circuit 38 has been incorporated to lessen the effect of such fluctuations on the output of amplifier stage 11. The signal appearing at the output of amplifier stage 11, as fed back via line 40, is rectified by diode 42 and applied to the base of transistor 39. The conductivity of transistor 39 is dependent upon the value of voltage applied to the base thereof, which in turn is dependent upon the amplitude of the signal present at the output of amplifier stage 11. As this output increases, the conductivity of transistor 39 also increases and a greater amount of the input signal from induction coil 23 applied to transistor 24 is shunted around this transistor by means of the lowered resistance path through automatic gain control transistor 39. By this means there is produced a regulating effect of the output of amplifier stage 11. Of course, a reduction in the output of this amplifier stage causes a corresponding lessening of the conductivity of transistor 39. The low-pass filter comprised by capacitance 45, resistance 46, and capacitance 47, functions to prevent application of the relatively higher frequency carrier signal to the automatic gain control circuit.

In the use of apparatus as described herein in combination with a voice communication link, it frequently is desired that a person at the transmitting end of the link be able to talk to a person at the receiving end of the link without requiring that the person at the receiving end physically remove the telephone handset from the vicinity of the induction coil 23. To accomplish this, there has been provided in the illustrative embodiment of the apparatus a speech amplifier 17 with driver stages including transistors 86 and 87, and power output transistors 88 and 89 connected in a push-pull arrangement to drive a suitable transducer such as speaker 18. Coupling between the second driver stage and the output stage is accomplished with transformer 90, while coupling from the output stage to speaker 18 is accomplished through transformer 91. Lamp 92, which may be of the flashlight or dial light type of incandescent bulb, is placed in the emitter circuit of the output stage so that the positive temperature-resistance characteristic of such lamps can provide a regulating effect to the output stage of amplifier 17. Excessive current flow through the output stage causes heating of the lamp filament, with resulting increased circuit resistance and decreased current flow.

The signal current present in induction coil 23 is coupled through band-elimination filter 19 and capacitance 93 to the base of transistor 86. The output from transistor 86 is applied through gain control potentiometer 94 to the base of transistor 87. The signal induced in coil 23 thus is amplified sufficiently to drive speaker 18 so that the signals being received by the telephone are readily audible to the operator of the apparatus and to others within the range of the speaker.

During reception by this apparatus of a cardiogram or other transmitted data, there is present in the signal transmitted over the communication link a carrier signal operating at some frequency such as, for example, 2 kc. Of course, this carrier signal is also amplified by amplifier 17 and impressed on speaker 18 to the annoyance of those present. Although the operator of the apparatus could reduce the volume of this amplified carrier signal by manipulating potentiometer 94, the need for such frequent adjustment detracts the attention of the operator from the primary task of recording the data and is, in general, a bothersome chore.

A simple and inexpensive expedient for overcoming this problem is afforded by placing a band-elimination filter 19, tuned to the frequency, e.g. 2 kc., of the carrier signal, in the line from induction coil 23 to amplifier 17. Although in the example given the filter removes a band of frequencies present in the speech range, this has been found to be not materially detrimental to the intelligibility of speech so long as the pass-band of filter 19 is reasonably narrow. The details of filter 19 have not been shown inasmuch as such band-elimination filters, per se, are known to those skilled in the art.

Electrical power to operate the various portions of receiving apparatus according to this invention may be supplied from any convenient source. For example, a suitable power supply could be incorporated to convert 115 v. AC to the required direct current. An alternative approach that has been found to be desirable to maintain the portability of the receiving equipment and to avoid the possibility of induced transient or other unwanted voltages arising from the presence in the receiver cabinet of power line voltages involves the provision of a suitable battery or batteries in common with the receiver apparatus for supplying appropirate voltages thereto. The battery may at the choice of the constructor be either of the dry-cell type, or the rechargeable type such as nickel-cadmium battery, or of some combination of these types.

In the illustrative embodiment of this invention, power for the entire apparatus is supplied by a single battery 79 of the nickel-cadmium type. Recharging of this battery from available power line sources is provided through suitable stepdown transformer 98, a diode 99, and current limiting resistor 100. Switch 101 enables battery 79 to be selectively connected either to the recharging circuit or to the operating portions of the receiver apparatus.

To aid in the operation of apparatus according to this invention and to facilitate troubleshooting of the apparatus in the event of a malfunction, a metering circuit has been incorporated to enable three important parameters to be measured quickly and easily. These parameters are (1) the vottage of battery 79, (2) the amplitude of the signal received by transducer 10, and (3) the frequency of the carrier signal received by the apparatus. The metering circuit includes meter 106 selectively connectable by switch 107 to first, second and third sets of contacts 108, 109 and 110, respectively. A fourth set of contacts is provided to remove the meter entirely from the switching circuit.

During a substantial portion of the discharge life of a nickel-cadmium battery, the battery terminal voltage varies only slightly from the terminal voltage of the battery in a fully charged condition. A substantial deviation from the voltage at full charge occurs only a short time before the useable charge on the battery is completely exhausted. Because of this, merely placing a conventional voltmeter across the battery terminals does not provide a meaningful indication of the actual degree of discharge of the battery. To overcome this disadvantage, meter 106 when connected with contacts 108 is inserted into a circuit which enables this meter to devote substantially its entire scale to reading that peak portion of the nickel-cadmium battery discharge curve which comprises the majority of the battery discharge life but which results in only a relatively small drop in battery terminal voltage.

It can be seen that the meter circuit includes potentiometer 102 connected across battery 79 to form a voltage divider. Connected in parallel across potentiometer 102 in a circuit including Zener diode 103 connected in the reverse direction, resistance 104, and another potentiometer 105. With switch 107 positioned so that meter 106 is connected across contacts 108, this meter is in a circuit wherein Zener diode 103, resistance 104 and potentiometer 105 form a series circuit with battery 79. Meter 108 is connected in parallel across potentiometer 105.

Zener diode 103 is selected in view of the terminal voltage of battery 79 in a fully charged state such that conduction through the diode in the reverse direction occurs only when the battery voltage exceeds a particular point on the voltage-time discharge curve of the battery. This point preferably is chosen to be at the region on the curve where the voltage fall-off with respect to time becomes relatively rapid. Because of this selection of Zener diode 103, conduction through the battery voltage measuring circuit varies from a maximum value when the battery is fully charged to a minimum or zero value when the battery discharges sufficiently that the battery voltage reaches the aforementioned region. In this way, substantially the entire scale of meter 106 may be used to indicate the state of charge of the battery between the fully charged condition and the aforementioned region.

With the apparatus according to this invention, a certain minimum level of signal must be received at transducer 10 before the apparatus dependably produces a meaningful output signal at the output thereof. So that the operator of the apparatus readily may ascertain whether this minimum level of input signal exists, meter 106 may be connected via switch 107 to terminals 109 to measure the level of this input signal. By doing this, meter 106 is connected to measure the automatic gain control voltage developed across resistance 48. Since this voltage is a function of the amplitude of the signal sensed by coil 23, meter 106 provides an accurate indication of this amplitude.

Since the faithful reproduction of data contained on a signal received by the apparatus of this invention depends, among other things, upon the accuracy of the transmitted carrier frequency with respect to a predetermined carrier frequency, it is desirable to provide a convenient way of measuring this frequency at the receiving end of the communication link. In this way, the operator of the receiving apparatus is immediately made aware of any abnormal deviation in carrier frequency and is alerted to the fact that the fidelity of information transmitted or to be transmitted may suffer accordingly.

By operating switch 107 so that meter 106 is connected to contacts 110, one terminal of this meter is connected to the slider of potentiometer 102 while the other meter terminal is connected directly to the collector of transistor 67. Since the average voltage at this point is a function of the frequency of the signal received by the apparatus of this invention, meter 106 can be calibrated to indicate the desired carrier frequency and undesirable deviations therefrom. To facilitate determining the correct frequency, potentiometer 102 may be adjusted such that the indicator of meter 106 is positioned at mid-scale or at some other appropriate position when the correct carrier frequency is being received.

Although the apparatus of this invention, in the embodiment described above, has been set forth as a separate, portable unit, it is apparent that this apparatus can be physically incorporated with a cardiograph or other suitable recording instrument as a unitary component thereof.

From the foregoing it can be seen that there has been disclosed and described a medical data receiving apparatus which is relatively straightforward in design and which may be used in conjunction with suitable transmitting apparatus designed and used to transmit medical data over a voice communication link such as the conventional telephone. Solid-state circuitry is used throughout to reduce current drain and to enhance the frequency stability and general ruggedness of the apparatus. In an actual apparatus built according to the teachings set forth herein, when used in conjunction with signals telephonically communicated from transmitting apparatus having a carrier frequency of 2 kc. and imposing on this carrier signals corresponding to the electrical impulses produced by the operation of the human heart, there was found to be available at output terminals 81 a signal of ±1 millivolt corresponding to a ±150 c.p.s. change of the 2 kc. carrier frequency.

Although this receiving apparatus has been described as being particularly useful for receiving cardiological data transmitted over a conventional telephone, it should be emphasized that a signal from any source utilizing, in general, a carrier frequency that is frequency modulated in accordance with some data being transmitted may be applied to the input of this receiving apparatus so long as the center frequency, sensitivity, and bandwidth of the receiver are properly chosen. Of course, transducer 10 may be any suitable device or apparatus for converting the input signal to an electrical signal suitable for driving amplifier 11 and speech amplifier 17. By way of additional example, transducer 10 could be a conventional microphone. Further alternatively, the receiving apparatus could be supplied with input signals by means of a direct wire connection to the communication link.

It should be understood of course that the foregoing disclosure relates to only a preferred embodiment of the invention and that numerous modifications or alterations may be made therein without departing from the spirit and scope of the invention as set forth in the appended claims.

What is claimed is:

1. Apparatus for receiving a signal which may include voice communication signals and a carrier signal having information impressed thereon by carrier frequency modulation, the frequency of the carrier signal being within the frequency range of the voice communication signals, comprising:

transducer means responsive to a signal to be received;
pulse generating means responsive to a signal received by said transducer means for producing pulses having substantially equal duration and whose repetition rate is a function of the instantaneous frequency of the received carrier signal so that the average value of said pulses is a function of the signal producing the modulation of the received carrier signal;
band-elimination filter means responsive to a signal received by said transducer means, said band-elimination filter means exhibiting a relatively high impedance and thus substantially attenuating signals at the carrier frequency and the modulation frequencies thereof and relatively low impedance to voice communication signals substantially removed in frequency from said carrier frequency and modulation frequencies;
amplifier means receiving the voice communication signals present at the output of said band-elimination filter means;
second transducer means receiving the amplified signals from said amplifier means and converting said amplified signals into audible sound; and
band-pass filter means interposed between said transducer means and said pulse generating means, said band-pass filter means having relatively low impedance to the passage of the carrier signal and the modulation thereof and having relatively high impedance and thus substantially attenuating the passage of other signals.

2. Apparatus as in claim 1 wherein the pulses produced by said pulse generating means are substantially rectangular.

3. Apparatus as in claim 1, wherein said pulse generating means comprises:

first pulse producing means responsive to a carrier signal received by said transducer means for producing pulses having a rate of occurrence determined by the instantaneous frequency of said received carrier signal; and
second pulse producing means responsive to pulses produced by said first pulse producing means, the pulses produced by said second pulse producing means having a predetermined duration and having a repetition rate determined by the rate of occurrence of the pulses produced by first pulse producing means.

4. Apparatus as in claim 1, further comprising:

frequency responsive filter means receiving the output of said pulse generating means, said frequency responsive filter means having relatively low impedance to signals in the range of the frequencies which produced the modulation of the carrier signal and having relatively high impedance and thus substantially attenuating the passage of the carrier signal.

5. Apparatus for receiving a signal including a carrier signal having information impressed thereon by carrier frequency modulation, comprising:

transducer means responsive to a signal to be received;
pulse generating means responsive to a signal received by said transducer means for producing pulses having substantially equal duration, the repetition rate of said pulses being a function of the instantaneous frequency of the received signal, so that the output signal of said pulse generator means includes a first signal component corresponding to the carrier signal and a second signal component corresponding to modulation present on the carrier signal;
frequency responsive filter means receiving the output signal of said pulse generating means, said frequency responsive filter means having relatively low impedance to the passage of signals of said second signal component and having relatively high impedance to the passage of said first signal component; and
circuit means receiving the output of said frequency responsive filter means and combining said output with a nulling signal equal in magnitude and opposite in polarity to that portion of said first signal component present at the output of said frequency responsive filter means so that the output from said circuit means consists essentially of said second signal component.

6. Apparatus as in claim 5, wherein said circuit means comprises a resistance across which the output of said frequency responsive filter means is present, and a voltage divider across at least a portion of which is present a nulling signal of equal magnitude to the magnitude of said first signal component present in said output of said frequency responsive filter means, said resistance and said portion of said voltage divider being connected to enable said first signal component to be cancelled by said nulling signal.

7. Apparatus as in claim 6, further comprising:

a potentiometer interconnecting a corresponding terminal of each of said resistance and said voltage divider portion such that only said second signal component appears across said potentiometer.

8. Apparatus for receiving a signal including a carrier signal having information impressed thereon by carrier frequency modulation, comprising:

transducer means responsive to a signal being received;
amplifier means connected to receive the output of said transducer means;
pulse generating means responsive to the output of said amplifier means to produce pulses which have substantially equal amplitude and duration, the repetition rate of said pulses being dependent upon the instantaneous frequency of said amplifier means output so that the average value of the output of said pulse generating means is a function of the signal producing the modulation of the received signal;
filter means receiving the output from said pulse generating means, said filter means presenting an output which is a reproduction of the signal producing the modulation of the received signal;
feedback circuit means associated with said amplifier means to limit variations in the amplitude of the amplifier means output to a fraction of the corresponding variations in amplifier means input signal amplitude, said feedback circuit means including a variable conductance element connected in shunt across the input of said amplifier means;
a control terminal of said variable conductance element being connected to be responsive to the output signal from said amplifier means so that an increase in the amplifier means output signal amplitude produces an increase in the conductance of said variable conductance element and a decrease in the amplifier means output signal amplitude produces a decrease in the conductance of said variable conductance element; and low pass filter means interposed in the connection between said amplifier output and said control terminal of said variable conductance element, said low pass filter having a relatively low impedance to signals in the range of frequencies which produced the modulation of the received signal and having a relatively high impedance to the carrier frequency to prevent substantial application of the received carrier signal to said control terminal.

9. Apparatus for receiving a signal transmitted over a conventional telephone system, the transmitted signal including a carrier signal having information impressed thereon by carrier frequency modulation and further including voice communication signals, the frequency of the carrier signal being within the frequency range of the voice communication signals, comprising:

wireless transducer means cooperative with a conventional telephone set to sense signals present in the set without resort to direct wire connection between said wireless transducer means and the telephone set;

band-pass filter means receiving the output of said wireless transducer means, said band-pass filter having relatively low impedance to the passage of the carrier signal and the frequency modulation thereof and having relatively high impedance and thus substantially attenuating the passage of other signals;

pulse generating means responsive to signals passed through said band-pass filter to produce pulses having a variable characteristic which is a function of the instantaneous frequency of such signals passed through said band-pass filter;

band-elimination filter means also receiving the output of said wireless transducer means, said band-elimination filter means having relatively high impedance and thus substantially attenuating signals at the carrier frequency and the frequency modulation thereof and having relatively low impedance to the voice communication signals substantially removed in frequency from said carrier frequency and modulation frequencies;

audio amplifier means receiving and amplifying the voice communication signals present at the output of said band-elimination filter means; and audio transducer means receiving the output of said audio amplifier means and converting said amplified signals into audible sound.

10. Apparatus as in claim 9, wherein said pulses produced by said pulse generating means have substantially equal amplitude and duration, the repetition rate of said pulses being a function of the instantaneous frequency of the signal received by said transducer means so that the average value of the pulse generating means output is a function of the signal producing the modulation of the received signal.

11. Apparatus as in claim 10, wherein said wireless transducer means comprises an induction coil disposed to permit selective positioning of at least a portion of a telephone set such that the magnetic field produced by operation of the telephone set is coupled to said induction coil.

12. Apparatus as in claim 10, wherein said pulse generating means comprises:

first pulse producing means responsive to the output of said amplifier means to produce pulses having a rate of occurrence determined by the instantaneous frequency of the received signal; and second pulse producing means responsive to the output from said first pulse producing means to produce pulses each having a predetermined duration and amplitude and having a repetition rate determined by the rate of occurrence of the pulses produced by said first pulse producing means.

13. Apparatus as in claim 12, further comprising:

frequency responsive filter means receiving the output of said second pulse producing means, said frequency responsive filter means having a relatively low impedance to the passage therethrough of the range of signals which produced the frequency modulation of the carrier signal and having a relatively high impedance and thus substantially attenuating the passage therethrough of the carrier signal.

References Cited

UNITED STATES PATENTS

| | | | |
|---|---|---|---|
| 2,697,745 | 12/1954 | Halstead | 179—15 X |
| 2,398,755 | 4/1946 | Shepherd. | |
| 2,720,584 | 10/1955 | Sloughter | 329—128 |
| 3,061,783 | 10/1962 | Noller | 179—2 X |
| 3,215,940 | 11/1965 | Fisher | 330—138 X |
| 3,267,933 | 8/1966 | Mills et al. | 128—2.06 |
| 3,284,659 | 11/1966 | Outhouse et al. | 307—233 X |
| 2,881,251 | 4/1959 | Strip. | |

ROBERT L. GRIFFIN, *Primary Examiner.*

J. A. BRODSKY, *Assistant Examiner.*

U.S. Cl. X.R.

179—15; 325—349; 330—26